(12) United States Patent
Park et al.

(10) Patent No.: US 10,535,126 B2
(45) Date of Patent: Jan. 14, 2020

(54) METHOD OF CORRECTING COLOR FRINGE AND METHOD OF PROCESSING IMAGE DATA USING THE SAME

(71) Applicant: SAMSUNG ELECTRONICS CO., LTD., Suwon-si, Gyeonggi-Do (KR)

(72) Inventors: Rae-Hong Park, Seoul (KR); Dong-Won Jang, Seoul (KR)

(73) Assignees: SAMSUNG ELECTRONICS CO., LTD., Suwon-si, Gyeonggi-Do (KR); SOGANG UNIVERSITY RESEARCH FOUNDATION, Seoul (KR)

(*) Notice: Subject to any disclaimer, the term of this patent is extended or adjusted under 35 U.S.C. 154(b) by 295 days.

(21) Appl. No.: 15/288,482

(22) Filed: Oct. 7, 2016

(65) Prior Publication Data

US 2017/0236259 A1    Aug. 17, 2017

(30) Foreign Application Priority Data

Feb. 17, 2016  (KR) .......................... 10-2016-0018733

(51) Int. Cl.
G06T 5/00       (2006.01)
H04N 5/217      (2011.01)
H04N 9/04       (2006.01)
G06T 5/40       (2006.01)

(52) U.S. Cl.
CPC ...... G06T 5/40 (2013.01); *G06T 2207/10024* (2013.01)

(58) Field of Classification Search
CPC ........... G06T 5/00; G06T 5/001; G06T 5/002; G06T 5/003; G06T 5/004; G06T 5/005; G06T 5/006; G06T 5/007; G06T 5/008; G06T 5/009; G06T 5/20; G06T 5/30; G06T 5/40; G06T 7/00; G06T 7/10; G06T 7/12; G06T 7/13; G06T 7/136; G06T 7/181; H04N 5/21; H04N 5/213; H04N 5/217; H04N 5/2175; H04N 9/00; H04N 9/04; H04N 9/045; H04N 9/077; H04N 9/083
USPC .................. 382/162–167, 199, 266–275
See application file for complete search history.

(56) References Cited

U.S. PATENT DOCUMENTS

| | | | |
|---|---|---|---|
| 7,011,413 B2* | 3/2006 | Wada | H04N 5/58 345/589 |
| 7,577,292 B2 | 8/2009 | Kang | |
| 7,577,311 B2 | 8/2009 | Palum et al. | |
| 7,605,848 B2 | 10/2009 | Lee et al. | |

(Continued)

*Primary Examiner* — Dwayne D Bost
*Assistant Examiner* — Stephen M Brinich
(74) *Attorney, Agent, or Firm* — F. Chau & Associates, LLC

(57) ABSTRACT

A color fringe is corrected by detecting a transition region that includes pixels adjacent in a linear direction. A color difference distribution in the transition region is modeled by a logistic function. Pixel color values in the transition region are corrected using the logistic function to maximize a correlation between a correction color and a reference color with respect to the transition region. Color distortion such as color fringes is corrected without corrupting the original colors of the image by modeling the color difference by the logistic function while maximizing the correlation using information of the undistorted region. A calculation cost is reduced by reducing the number of the parameters required to optimize the logistic function.

19 Claims, 13 Drawing Sheets

(56) References Cited

U.S. PATENT DOCUMENTS

| | | |
|---|---|---|
| 8,436,910 B2 | 5/2013 | Kinoshita |
| 8,582,878 B1 | 11/2013 | Tzur et al. |
| 8,634,642 B2 | 1/2014 | Matsuoka |
| 8,798,389 B2 | 8/2014 | Hatakeyama |
| 9,047,679 B2 | 6/2015 | Kim et al. |
| 9,135,681 B2 | 9/2015 | Tomaselli et al. |
| 9,167,216 B2 | 10/2015 | Kano |
| 2011/0158515 A1* | 6/2011 | Chuang .................. H04N 1/58 382/163 |
| 2012/0314947 A1* | 12/2012 | Komatsu ................ G06T 5/001 382/167 |
| 2015/0172612 A1 | 6/2015 | Overgaard et al. |

* cited by examiner

| SAMPLE PICTURE | PSNR(dB) | | | | |
| --- | --- | --- | --- | --- | --- |
| | CASE1 | CASE2 | CASE3 | CASE4 | CASE5 |
| PIC1 | 36.88 | 38.79 | 37.79 | 38.72 | 39.34 |
| PIC2 | 32.30 | 36.31 | 34.60 | 36.47 | 37.30 |
| PIC3 | 34.90 | 35.96 | 35.19 | 36.19 | 36.31 |

METHOD OF CORRECTING COLOR FRINGE AND METHOD OF PROCESSING IMAGE DATA USING THE SAME

CROSS-REFERENCE TO RELATED APPLICATION

This U.S. Non-provisional application claims priority under 35 USC § 119 from, and the benefit of, Korean Patent Application No. 10-2016-0018733, filed on Feb. 17, 2016 in the Korean Intellectual Property Office (KIPO), the contents of which are herein incorporated by reference in their entirety.

BACKGROUND

1. Technical Field

Exemplary embodiments relate generally to data processing, and more particularly to a method of correcting a color fringe and method of processing image data.

2. Discussion of the Related Art

When an image sensor captures a real scene color distortions such as a color fringe may occur near a boundary of an object in a digital color image. The color fringe phenomenon may become serious when resolution of the digital color image increases and the image sensor is used for more detailed image acquisition. In general, the color fringe is caused by chromatic aberration in the optical system and the blooming effect. Chromatic aberration is a type of color distortion that occurs when lenses of the image sensor do not focus light of different wavelengths on a convergence point. The index of refraction of the lens changes according to the light wavelength and thus light of different wavelengths passing through the lens cannot be focused on the same plane. The blooming effect is related to characteristics of the image sensor. When intense light is incident on the image sensor, the accumulated charge in a pixel may overflow into adjacent pixels and a blooming charge may cause color artifacts in a near-saturation region.

SUMMARY

Some exemplary embodiments provide a method of correcting a color fringe to reduce color distortion near an object boundary.

Some exemplary embodiments provide a method of processing image data using a method of correcting a color fringe.

According to exemplary embodiments, a method of correcting a color fringe includes detecting a transition region that includes pixels adjacent in a linear direction, modeling a color difference distribution in the transition region with a logistic function, and correcting color values of the pixels in the transition region using the logistic function.

According to exemplary embodiments, a method of processing image data includes detecting first transition regions, each first transition region including pixels adjacent in a first direction, detecting second transition regions, each second transition region including pixels adjacent in a second direction perpendicular to the first direction, modeling a color difference distribution in each of the first transition regions and the second transition regions with a logistic function, and correcting color values of the pixels in each of the first transition regions and the second transition regions using the logistic function.

According to exemplary embodiments, a system for correcting a color fringe includes a transition region detector that detects from input image data a transition region that includes pixels adjacent in a linear direction, a function value calculator that models transition region information with a logistic function, a color value calculator that calculates first corrected image data based on the input image data and logistic function values output by the function value calculator, a correlation value calculator that calculates a correlation based on the first corrected image data, and a comparator that compares the values of the correlation received from the correlation value calculator and outputs second corrected image data that corresponds to a maximum of the correlation.

A method of correcting color fringes and a method of processing image data according to exemplary embodiments can correct color distortion such as color fringes without corrupting the original colors of the image by modeling the color difference CD with the logistic function LF while maximizing the correlation by using information of the undistorted region.

In addition, a method of correcting a color fringe and a method of processing image data according to exemplary embodiments can reduce a calculation cost by reducing the number of the parameters required to optimize the logistic function LF.

DETAILED DESCRIPTION OF THE EMBODIMENTS

Figure 1:
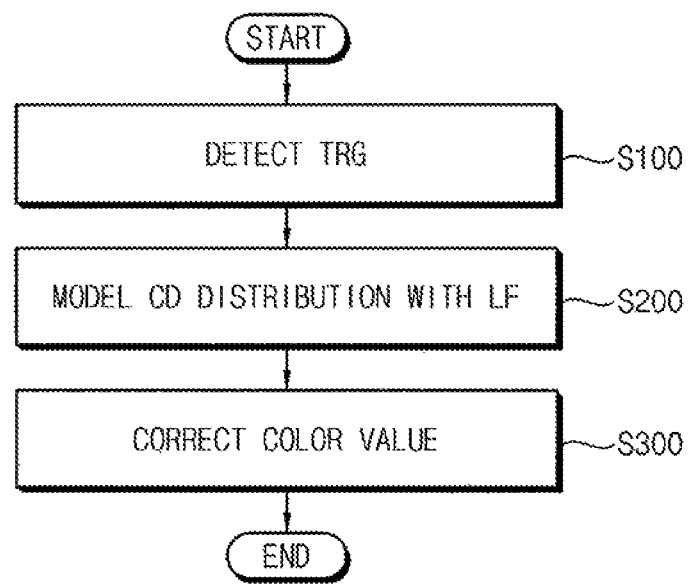
FIG. 1 is a flow chart of a method of correcting a color fringe according to exemplary embodiments.

Various exemplary embodiments will be described more fully hereinafter with reference to the accompanying drawings, in which some exemplary embodiments are shown. In the drawings, like numerals may refer to like elements throughout. The repeated descriptions may be omitted.

FIG. 1 is a flow chart of a method of correcting a color fringe according to exemplary embodiments.

Referring to FIG. 1, a transition region TRG is detected that includes pixels adjacent in a linear direction (S100). A distribution of color differences CD in the transition region TRG is modeled by a logistic function LF (S200). Color values of the pixels in the transition region TRG are corrected using the logistic function LF (S300). As will be described below, color values of the pixels in the transition region TRG can be corrected such that a correlation between a correction color and a reference color is maximized with respect to the transition region TRG. Color distortion, such as a color fringe, can be corrected without corrupting the original colors of the image by modeling the color difference CD with the logistic function LF and maximizing the correlation by using information of the undistorted region.

Figure 2:
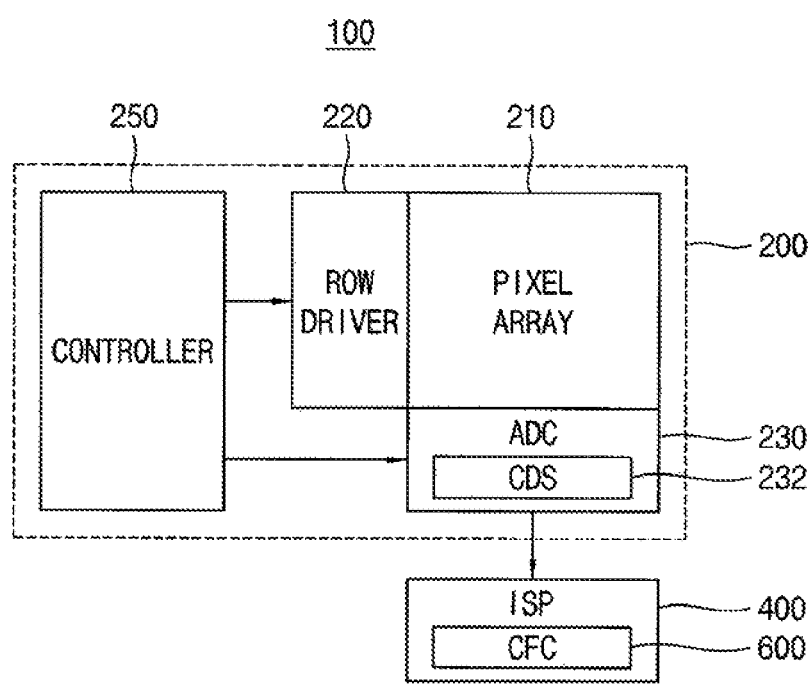
FIG. 2 is a block diagram of a sensor system according to exemplary embodiments.

FIG. 2 is a block diagram of a sensor system according to exemplary embodiments.

Referring to FIG. 2, a sensor system 100 according to exemplary embodiments includes an image sensor 200 and an image signal processor (ISP) 400. The image sensor 200 includes a pixel array 210, a row driver 220, an analog-to-digital converter (ADC) block 230 and a controller 250. The image sensor 200 and the image processor 400 may be integrated in one chip or in multiple chips.

According to exemplary embodiments, the pixel array 210 generates analog pixel signals based on incident light. The pixel array 210 includes a plurality of unit pixels arranged in a matrix form of rows and columns. The unit pixels have an arrangement pattern for sensing color images. For example, each unit pixel may be a monochrome pixel for sensing visible light, and each pixel may be coupled to either a red (R), green (G), or blue (B) filter. Typically, complementary metal-oxide semiconductor (CMOS) image sensors and charge-coupled device (CCD) image sensors have R, G and B fitters in a predetermined arrangement pattern. For example, the R, G and B filters may be arranged in a Bayer pattern that includes 25% R filters, 50% G filters, and 25% B filters to reflect human visual characteristics. In the case of a Bayer pattern, the image sensor 200 can provide RGB Bayer image data such that each pixel has either a R, G or B color value. In some embodiments, the plurality of pixels have an arrangement pattern for sensing color images that uses cyan (C), magenta (M), and yellow (Y) filters or other similar arrangement pattern for sensing color images.

According to exemplary embodiments, the row driver 220 is coupled to row lines of the pixel array 210 and generates signals for driving the row lines. The row driver 220 selects the unit pixels in the pixel array 210 row by row by driving one row line at a time.

According to exemplary embodiments, the ADC block 230 is coupled to column lines of the pixel array 210 to convert analog signals of the column lines to digital signals. In some exemplary embodiments, the ADC block 230 includes a plurality of converters. Each of the plurality of converters is coupled to a corresponding column line to perform column-based analog-to-digital conversion. That is, the analog signals are converted in parallel and simultaneously output through the column lines. In other exemplary embodiments, The ADC block 230 includes one common converter for performing single column analog-to-digital conversion. That is, columns of analog signals are sequentially converted.

According to exemplary embodiments, the ADC block 230 includes a correlated double sampling (CDS) unit 232 for extracting effective signal components. For example, the CDS unit 232 can perform an analog double sampling (ADS) by obtaining the difference between a reset component and a measured signal component using capacitors and switches to output analog signals corresponding to the effective signal components. According to exemplary embodiments, the CDS unit 232 can perform a digital double sampling (DDS) such that the analog signals corresponding to the reset component and the measured signal component are converted into the digital signals, respectively, and the effective signal component is extracted by obtaining the difference between the two digital signals. The CDS unit 232 can be configured to perform both analog double sampling and digital double sampling.

According to exemplary embodiments, the controller 250 controls the row driver 220 and the ADC block 230. The controller 250 provides control signals such as a clock signal, a timing signal, or other similar control signals for operating the row driver 220 and the ADC block 230. For example, the controller 250 may include a logic control circuit, a phase-locked loop (PLL) circuit, a timing control circuit, a communication interface circuit, or other similar control circuits.

According to exemplary embodiments, the image signal processor 400 receives the digital signals from the image sensor 200 and performs data processing with respect to the received digital signals. For example, the image signal processor 400 may perform image interpolation, color correction, white balance, gamma correction, color conversion, or other similar signal processing operations. In particular, according to exemplary embodiments, the image signal processor 400 includes a color fringe corrector (CFC) 600.

Figure 3:
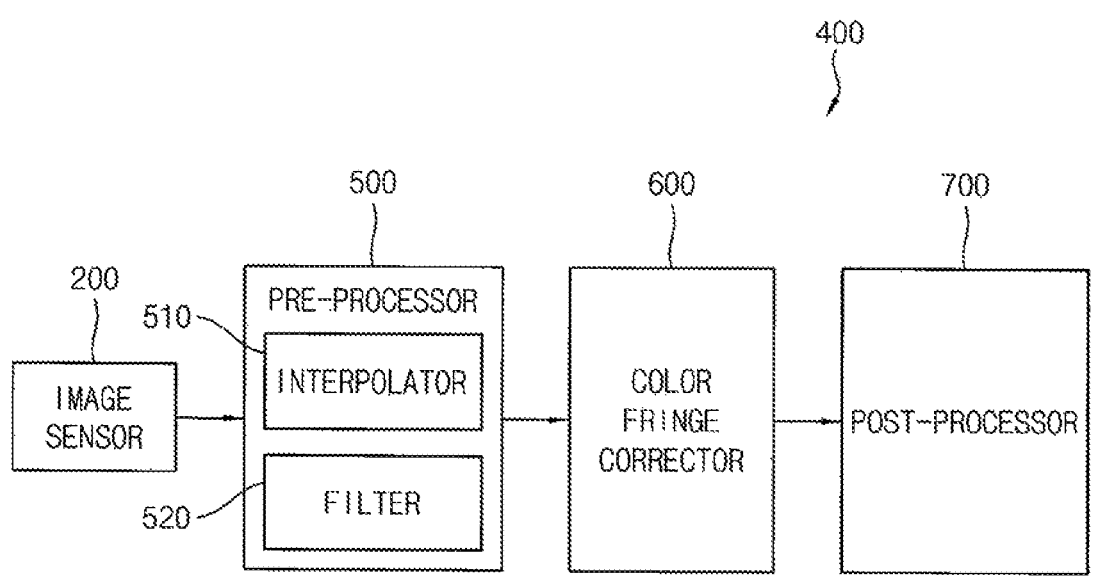
FIG. 3 is a block diagram of an image signal processor according to an exemplary embodiment.

FIG. 3 is a block diagram of an image signal processor according to an exemplary embodiment.

Referring to FIG. 3, the image signal processor 400 includes a pre-processor 500, a color fringe corrector 600 and a post-processor 700. The pre-processor 500 includes an interpolator 510 and a filter 520.

According to exemplary embodiments, the interpolator 510 performs an interpolating operation that converts RGB Bayer image data from the image sensor 200 to RGB full color image data. The RGB Bayer image data are represented by a data format in which each pixel has either a R, G or B color value, and the RGB full color image data are represented by a data format in which each pixel has all of the R, G and B color values. The interpolator 510 may perform pixel doubling interpolation, bilinear interpolation, etc., based on the RGB Bayer image data to provide the RGB full color image data.

According to exemplary embodiments, the filter 520 performs a filtering operation that removes noise from the image data. For example, the filter 520 may be a bilateral filter that smoothes an image while conserving edges in the image. The bilateral filter is a nonlinear filter whose output is represented by an adaptive average. When the input image includes noise, a low pass Gaussian filter can be used to remove the noise. An intensity-based edge-stop function that takes as input intensity differences between pixels can be used to calculate weight values of the Gaussian filter coefficients. With respect to edge portions, where intensity differences are large, the weight value is decreased to prevent edge blurring. When the intensity differences are small, the weigh value is increased to remove the noise. Through such bilateral filtering, isolation regions or holes in saturation regions can be removed as will be described with reference to FIG. 13. The color values of the saturated pixels can be detected as being less than the real values because of various noise in the image sensor, interpolation of the color filter array, etc. The bilateral filter can remove such unreliable detection in the saturation region.

In some exemplary embodiments, the interpolation of the interpolator 510 is performed first and then the noise filtering of the filter 520 is performed with respect to the interpolated image data. In other exemplary embodiments, the noise filtering is performed first, and then the interpolation is performed with respect to the noise-filtered image data. In still other exemplary embodiments, the interpolation and the noise filtering are performed simultaneously.

According to exemplary embodiments, the color fringe corrector 600 receives the RGB full color image data from the pre-processor 500 and corrects the color fringe and image data processing using the color fringe correction. The corrected image data are provided to the post-processor 700 for further processing.

Figure 4:
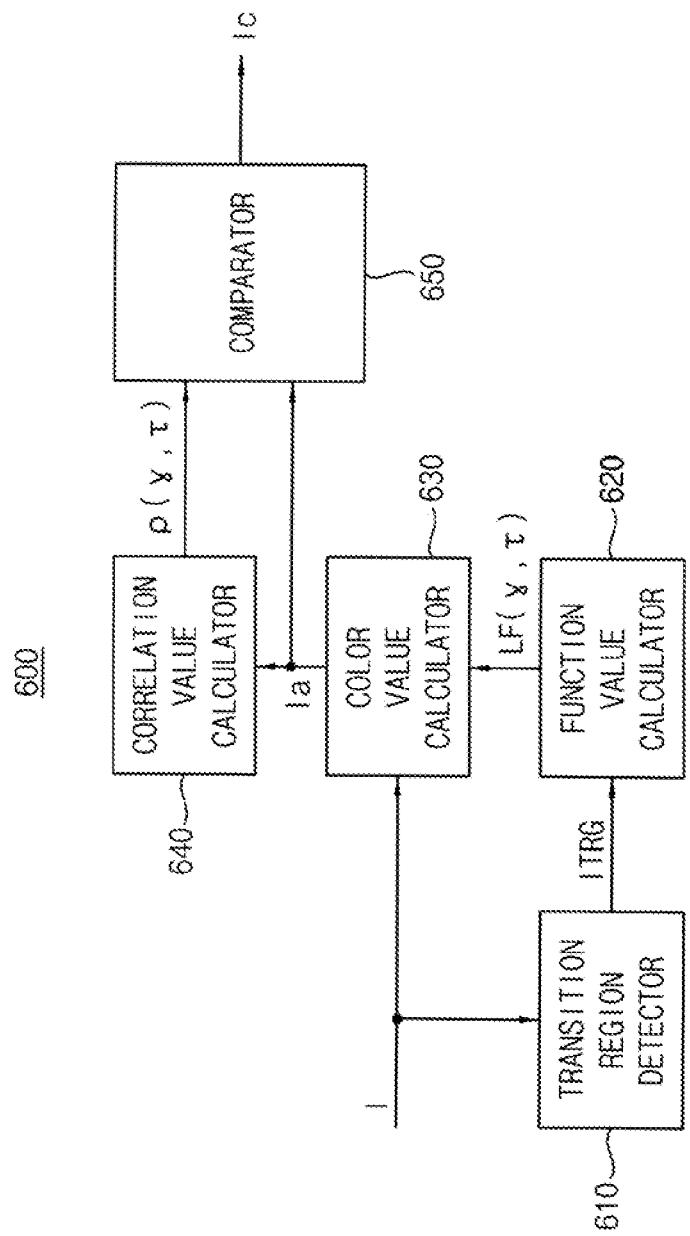
FIG. 4 is a block diagram of a color fringe corrector included in the image signal processor of FIG. 3.

FIG. 4 is a block diagram of a color fringe corrector included in the image signal processor of FIG. 3.

Referring to FIG. 4, a color fringe corrector 600 according to an exemplary embodiment includes a transition region detector 610, a function value calculator 620, a color value calculator 630, a correlation value calculator 640 and a comparator 650.

FIG. 4 illustrates that the transition region detector 610, the function value calculator 620, the color value calculator 630, the correlation value calculator 640 and the comparator 650 are distinct components, but embodiments are not limited thereto, and in other embodiments, at least two of them can be inseparably combined. In addition, the color fringe corrector 600 may be implemented as software, hardware or a combination of software and hardware.

According to an embodiment, the transition region detector 610 detects the transition region TRG based on input image data I and outputs transition region information ITRG. The transition region TRG is a one-dimensional region that includes pixels adjacent in a linear direction. The linear direction may be a horizontal direction, a vertical direction, a diagonal direction or an anti-diagonal direction in the image frame.

The transition region TRG may be determined through various methods. In some exemplary embodiments, the transition region detector 610 detects the transition region TRG based on color value gradients in the input image data I and the gradient values can be calculated by the Sobel mask as expressed by Equation 1:

$$Ec(i,j)=C(i-1,j-1)+2C(i,j-1)+C(i+1,j-1)-C(i-1,j+1)-2C(i,j+1)-C(i+1,j+1).$$ Equation 1

In Equation 1, Ec( ) is the gradient value, C( ) is a respective color value of the input image data I, (i, j) is a pixel position on the image frame, i is a pixel row number and j is a pixel column number. Equation 1 represents a vertical Sobel mask corresponding to processing based on the horizontal direction (hereinafter referred to as horizontal processing), that is, processing with the fixed value of i. In case of processing based on the vertical direction (hereinafter referred to as vertical processing), that is, processing with the fixed value of j, a horizontal Sobel mask can be used. In case of the fixed i, the gradient value is represented by Ec(j) and the color value is represented by C(j). As will be described below with reference to FIGS. 11 and 12, horizontal processing and vertical processing can be performed independently.

According to an embodiment, the transition region detector 610 detects a reference pixel p with a reference color whose gradient value is greater than or equal to a threshold value. For example, the reference color may be green G. In case of horizontal processing, the transition region detector 610 expands the transition region TRG pixel by pixel such that the transition region TRG includes a pixel linearly adjacent to the reference pixel p if at least one color of the adjacent pixel has a gradient value greater than or equal to the threshold value. In addition, during the expansion process, the transition region TRG detector 610 determines boundary pixels of the transition region TRG for which all color (i.e., red, green and blue) gradient values are less than the threshold value. The boundary pixels of the horizontal transition region TRG are represented by a left boundary coordinate l(p) and a right boundary coordinate r(p). The transition region information ITRG output by the transition region detector 610 includes the boundary coordinates l(p) and r(p).

In some exemplary embodiments, the transition region detector 610 determines a pixel as a boundary pixel if the pixel is the first pixel found during the process of expanding the transition region TRG, all colors of which have gradient values less than the threshold value. In other exemplary embodiments, the transition region detector 610 determines a pixel as a boundary pixel if the pixel is the second pixel found during the process of expanding the transition region TRG, all colors of which have the gradient values less than the threshold value.

According to an embodiment, the function value calculator 620 provides function values of the logistic function LF that models the transition region information ITRG. According to exemplary embodiments, the function value calculator 620 determines the logistic function LF from Equation 2:

$$LF(x) = K'c_2(x) = \frac{A}{1+e^{-\gamma(x-\tau)}} + B$$ Equation 2

In Equation 2, LF( ) is a function value of the logistic function LF, x is a pixel coordinate, A is a first parameter, B is a second parameter, $\gamma$ is a third parameter and $\tau$ is a fourth parameter, $c_2$ is the correction color to be corrected, and $K'c_2$( ) is a calculated color difference between the correction color and the reference color. The first parameter A and the second parameter B are associated with the upper and lower limits of the logistic function LF. The third parameter $\gamma$ is a sharpness of the logistic function LF and the fourth parameter $\tau$ is an offset of the logistic function LF.

According to an embodiment, the first parameter A and the second parameter B can be determined from Equation 3. The third parameter $\gamma$ and the fourth parameter $\tau$ can be determined by optimizing the fitting of the logistic function LF.

$A=Kc_2\text{max}-Kc_2\text{min}$ $B=Kc_2\text{min}$ $Kc_2\text{min}=\text{min }\{Kc_2[l(p)], Kc_2[r(p)]\}$ $Kc_2\text{max}=\text{max }\{Kc_2[l(p)], Kc_2[r(p)]\}$ $Kc_2[x]=C_2(x)-C_1(x)$ Equation 3

In Equation 3, l(p) and r(p) are coordinates of the boundary pixels of the transition region TRG, and $Kc_2$[ ] is the color difference between the color value of the correction color $C_2(\ )$ and the color value of the reference color $C_1(\ )$. The color differences $Kc_2[l(p)]$ and $Kc_2[r(p)]$ at the boundary pixels are included in the transition region information ITRG provided from the transition region detector 610.

In some exemplary embodiments, the input image data I is the RGB image data, the reference color is green G and the correction color to be corrected may be red R or blue B. With respect to the same transition region TRG, the color fringe corrector 600 can correct red color values independently from the blue color values. In other words, the color fringe corrector 600 can correct red color values of the pixels in the transition region TRG to maximize a correlation between red R and green G and independently correct blue color values of the pixels in the transition region TRG to maximize a correlation between blue B and green G. In some exemplary embodiments, the red color values may be corrected before the blue color values are corrected. In other exemplary embodiments, the blue color values may be corrected before the red color values are corrected.

According to an embodiment, the function value calculator 620 outputs a red logistic function K'r(x) when the correction color $C_2$ is red R in Equations 2 and 3. In contrast, the function value calculator 620 outputs a blue logistic function K'b(x) when the correction color $C_2$ is blue B in Equations 2 and 3. The red logistic function K'r(x) corresponds to the calculated color difference between red R and green G, and the blue logistic function K'b(x) corresponds to the calculated color difference between blue B and green G.

According to an embodiment, the color value calculator 630 outputs calculated image data $I_a$ that are calculated based on the input image data I and the function value LF( ) output by the function value calculator 620. The calculated image data $I_a$ include a plurality of calculated color values as expressed by Equation 4:

$$C'_2(x) = K'c_2(x) + C_1(x),$$

$$C'_1(x) = C_1(x). \quad \text{Equation 4}$$

In Equation 4, $C'_2(\ )$ is the calculated correction color value of the correction color $c_2$, $C'_1(\ )$ is the calculated reference color value of the reference color $C_1$. The calculated correction color value $C'_2(\ )$ corresponds to a sum of the logistic function LF value $K'c_2(\ )$ and the input color value $C_1(\ )$ of the reference color. The calculated reference color value $C'_1(\ )$ is the same as the input color value $C_1(\ )$ of the reference color $C_1$.

For example, when the reference color $C_1$ is green G and the correction color $C_2$ is red R or blue B, the calculated color values may be represented by Equation 5:

$$R'(x) = K'r(x) + G(x)$$

$$B'(x) = K'b(x) + G(x)$$

$$G'(x) = G(x) \quad \text{Equation 5}$$

In Equation 5, R'( ) is the calculated red color value and B'( ) is the calculated blue color value. The calculated red color value R'( ) corresponds to a sum of the calculated red color difference K'r( ) and the input green color value G( ). The calculated blue color value B'( ) corresponds to a sum of the calculated blue color difference K'b( ) and the input green color value G( ). The calculated green color value G'( ) is the same as the input green color value G( ).

According to an embodiment, the correlation value calculator 640 outputs a correlation based on the calculated image data $I_a$. In some exemplary embodiments, the correlation is determined by Equation 6:

$$\rho(C'_2(k), C_1) = \frac{\sum_{k=l(p)}^{r(p)} (C'_2(k) - mc_2)(C_1(k) - mc_1)}{\sqrt{\sum_{k=l(p)}^{r(p)} (C'_2(k) - mc_2)^2} \sqrt{\sum_{k=l(p)}^{r(p)} (C_1(k) - mc_1)^2}}, \quad \text{Equation 6}$$

$$C'_2(x) = K'c_2(x) + C_1(x)$$

In Equation 6, $\rho(\ )$ is a value of the correlation, l(p) and r(p) are coordinates of the boundary pixels of the transition region TRG, k is a pixel coordinate that ranges from l(p) to r(p), $C'_2(\ )$ is a calculated color value of the correction color obtained using the logistic function $K'c_2$, $C_1(\ )$ is the color value of the reference color, $mc_1$ is an average value of $C_1$ and $mc_2$ is an average value of $C'_2$.

According to an embodiment, the comparator 650 compares the values of the correlation received from the correlation value calculator 640. The comparator 650 outputs corrected image data $I_c$ that corresponds to a maximum of the correlation values. The comparator 650 outputs, as the final corrected color value $C''_2(\ )$, the calculated correction color value $C''_2(\ )$ that corresponds to a maximum correlation value. The reference color value $C_1$ is output without correction.

$$C''_2(x) = \arg\max_{C'_2}\{|\rho(C'_2, C_1)|\} \quad \text{Equation 7}$$

As a result, the sum of the logistic function value $K'c_2(\ )$ and the reference color value $C_1(\ )$ that correspond to the maximum correlation value is output as the corrected color value $C''(\ )$ of the correction color $C_2$.

According to embodiments, the color fringe corrector 600 calculates the values $\rho(\ )$ of the correlation by changing the third parameter $\gamma$ and the fourth parameter $\tau$ of the logistic function to determine an optimal logistic function that corresponds to a maximum correlation value. As such, corrected pixel color values are output based on the optimized or fitted logistic function.

In some exemplary embodiments, the color fringe corrector 600 optimizes the logistic function, that is, the correction color differences based on the Nelder-Mead method. In the Nelder-Mead method, the calculation speed can be enhanced by properly selecting the initial values of the parameters of the logistic function. For example, the third parameter $\gamma$ can be initialized to 1 and the fourth parameter $\tau$ can be initialized to |l(p)−r(p)|/2, which corresponds to a center position of the transition region TRG.

As such, the color fringe corrector 600 according to exemplary embodiments corrects color distortions such as color fringes without corrupting the original colors of the image by modeling the color difference CD with the logistic function LF and maximizing the correlation while using information of the undistorted region.

Figure 5A:
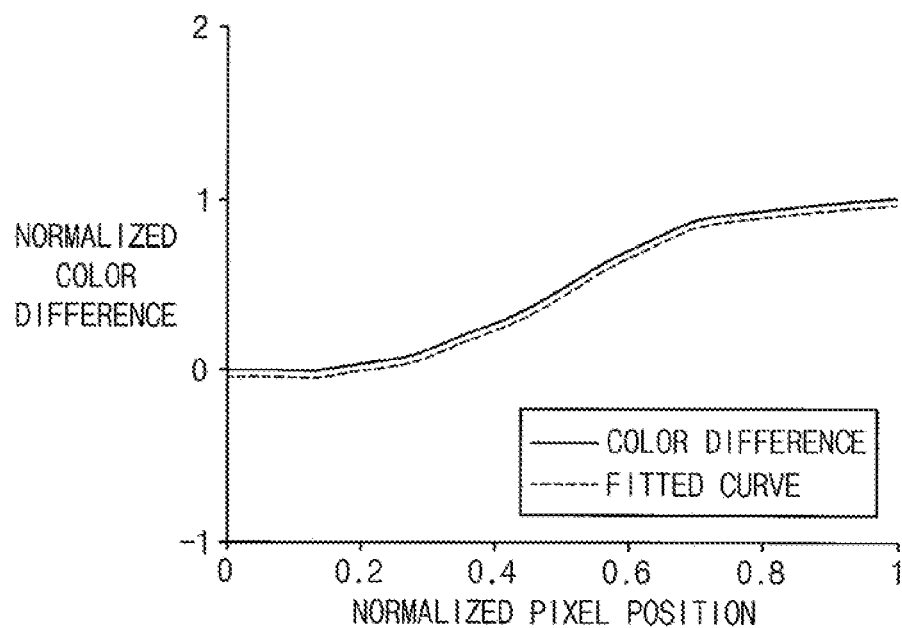
FIGS. 5A and 5B illustrate a relationship between a color difference distribution and a logistic function.
Figure 5B:
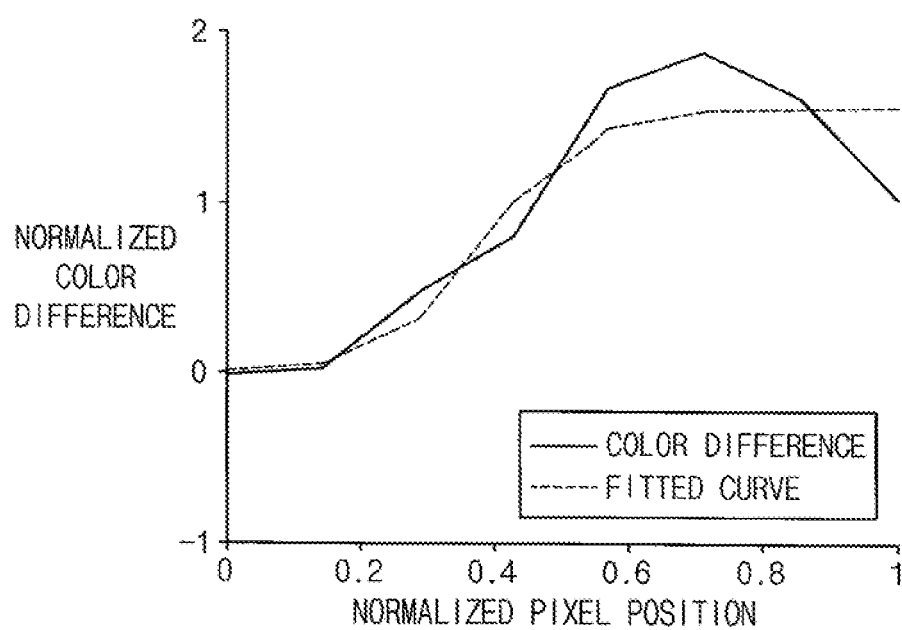

FIGS. 5A and 5B illustrate a relationship between a color difference distribution and a logistic function. In FIGS. 5A and 5B, the horizontal axis represents the normalized pixel position and the vertical axis represents the normalized color difference.

FIG. 5A shows a case where distortion due to color fringe is relatively weak and FIG. 5B shows a case where the distortion is relatively strong. The color difference tends to maintain uniform values and increases or decreases monotonically at an edge that corresponds to a boundary between an object and a background. The color difference changes abruptly as illustrated in FIG. 5B when the color fringe is strong. The logistic function can be characterized by a flexible sharpness and a flexible offset. As shown in FIGS. 5A and 5B, the color difference can be fit to the logistic function when the color fringe is weak but not as well when the color fringe is strong.

According to exemplary embodiments, the color difference is modeled by or fit to the logistic function by using information of the maximally correlated undistorted regions. Thus, color distortion, such as color fringes, can be reduced without corrupting the original colors of the image.

Figure 6A:
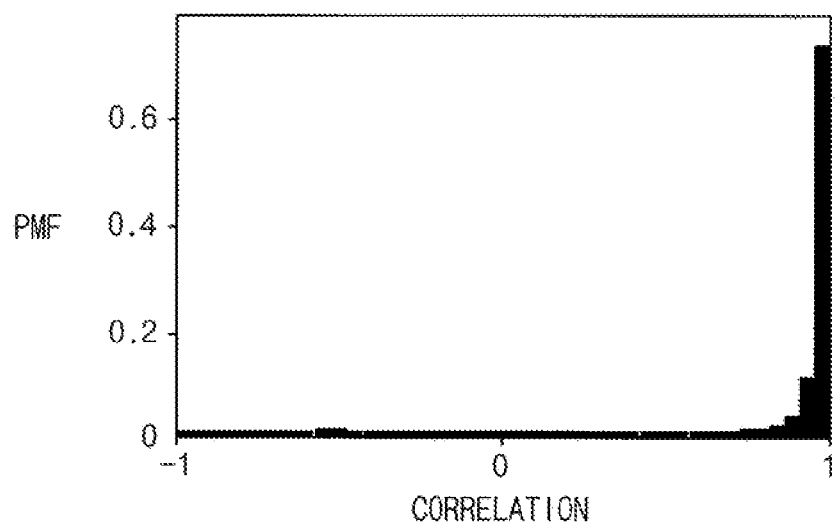
FIGS. 6A and 6B illustrate correlation distributions.
Figure 6B:
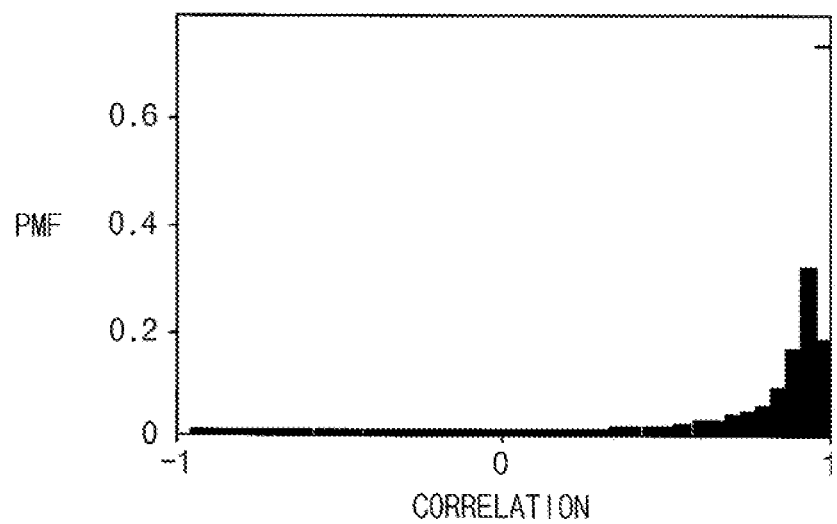

FIGS. 6A and 6B illustrate correlation distributions. In FIGS. 6A and 6B, the horizontal axis represents the correlation and the vertical axis represents the probability mass function (PMF).

FIG. 6A shows a case where distortion due to a color fringe is relatively weak and FIG. 5B shows a case where the distortion is relatively strong. The correlation is concentrated at 1 as illustrated in FIG. 6A when the color fringe is weak but the correlation is reduced as illustrated in FIG. 6B when the color fringe is strong.

According to exemplary embodiments, by maximizing the correlation, color distortion, such as a color fringe, can be reduced without corrupting the original colors of the image.

Figure 7A:
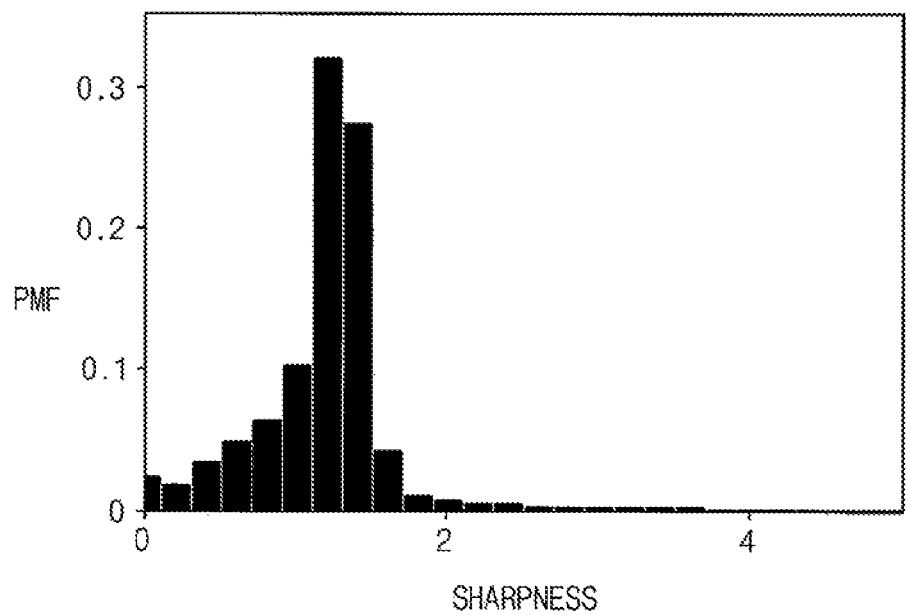
FIGS. 7A and 7B illustrate distributions of parameters of a logistic function.
Figure 7B:
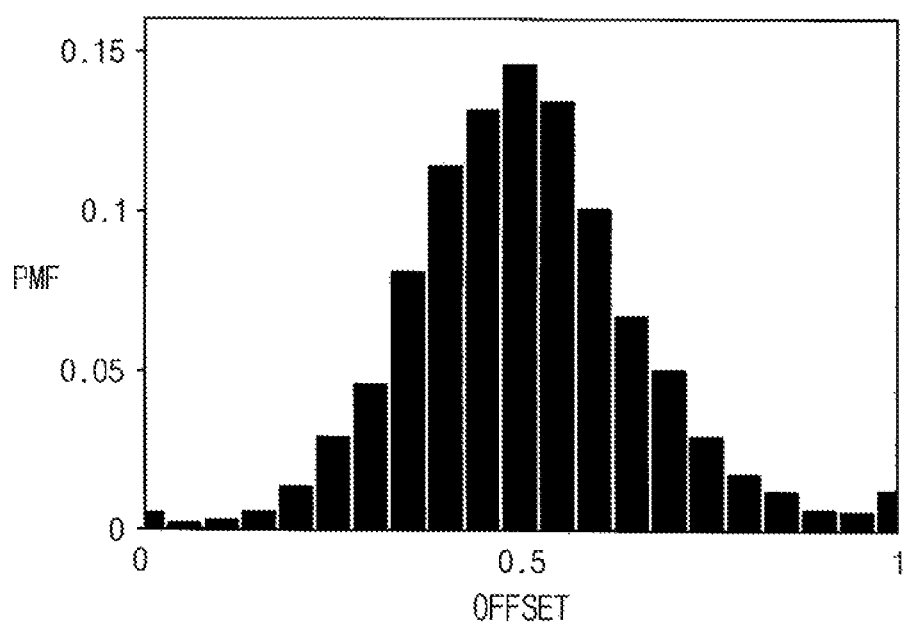

FIGS. 7A and 7B illustrate distributions of parameters of a logistic function. In FIG. 7A, the horizontal axis represents the above-mentioned third parameter γ, that is, the sharpness of the logistic function, and the vertical axis represents the PMF. In FIG. 7B, the horizontal axis represents the above-mentioned fourth parameter τ, that is, the offset of the logistic function, and the vertical axis indicates the PMF.

The logistic function can be represented by four parameters A, B, γ and τ1. Although the logistic function can be fit by varying all four parameters A, B, γ and τ, the amount of calculation increases significantly.

In some exemplary embodiments, as represented by Equation 3, the first parameter A and the second parameter B can be fixed to constant values using the color differences of the boundary pixels. In this case, only the third parameter γ and the fourth parameter τ need be varied and optimized to maximize the correlation between the correction color $C_2$ and the reference color $C_1$ with respect to the transition region TRG. As such, the calculation cost of optimizing the logistic function can be reduced by reducing the number of the parameters of the logistic function from four to two.

Referring to FIGS. 7A and 7B, the sharpness of the logistic function is concentrated at about 1.2 but the offset of the logistic function is relatively spread out.

In some exemplary embodiments, to further reduce the calculation cost of optimizing the logistic function, the third parameter γ can be fixed to a predetermined constant value, such as 1.2. In this case, only the fourth parameter τ need be varied and optimized to maximize correlation between the correction color $C_2$ and the reference color $C_1$ with respect to the transition region TRG. As such, the calculation cost of optimizing the logistic function can be further reduced by reducing the number of the parameters of the logistic function from four to one.

Figure 8:
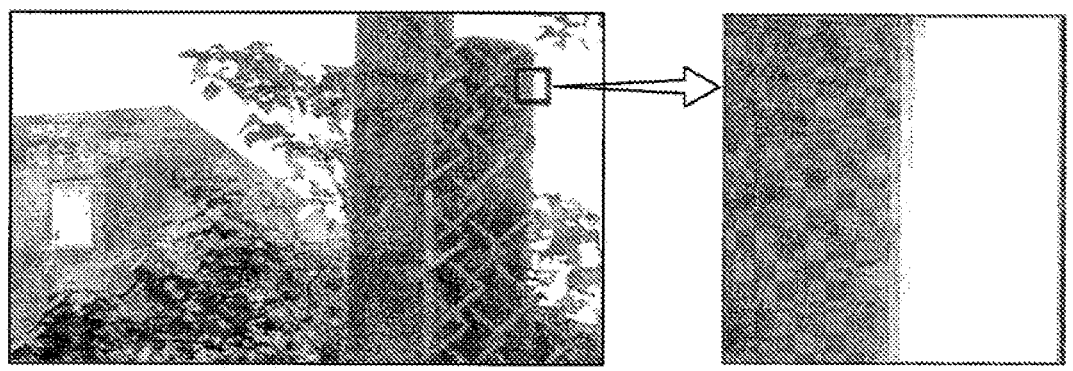
FIG. 8 illustrates an example of an input image that includes a color fringe region.
Figure 9A:
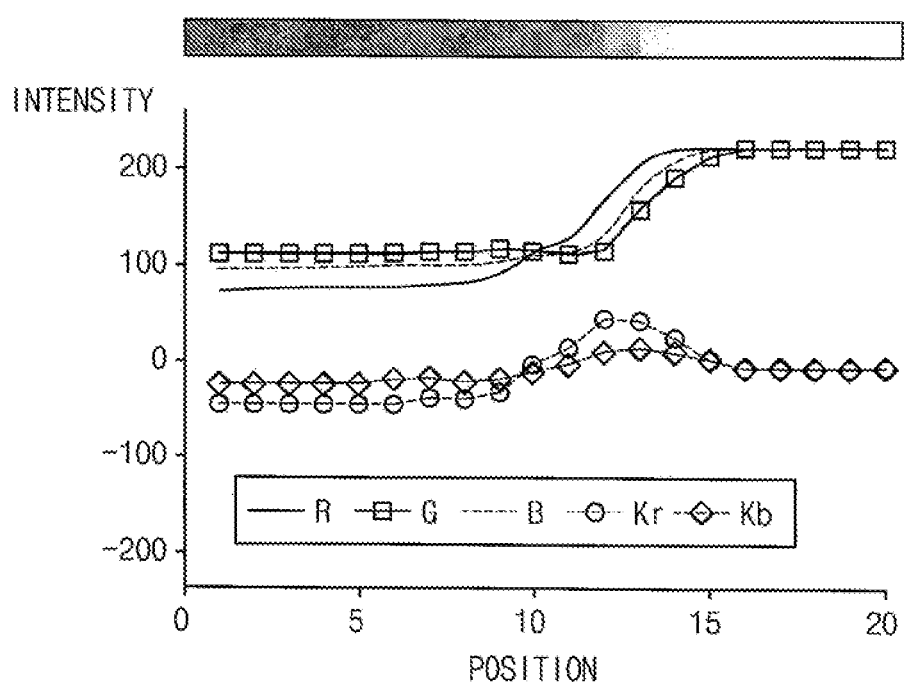
FIG. 9A illustrates an intensity profile of an input image of FIG. 8.
Figure 9B:
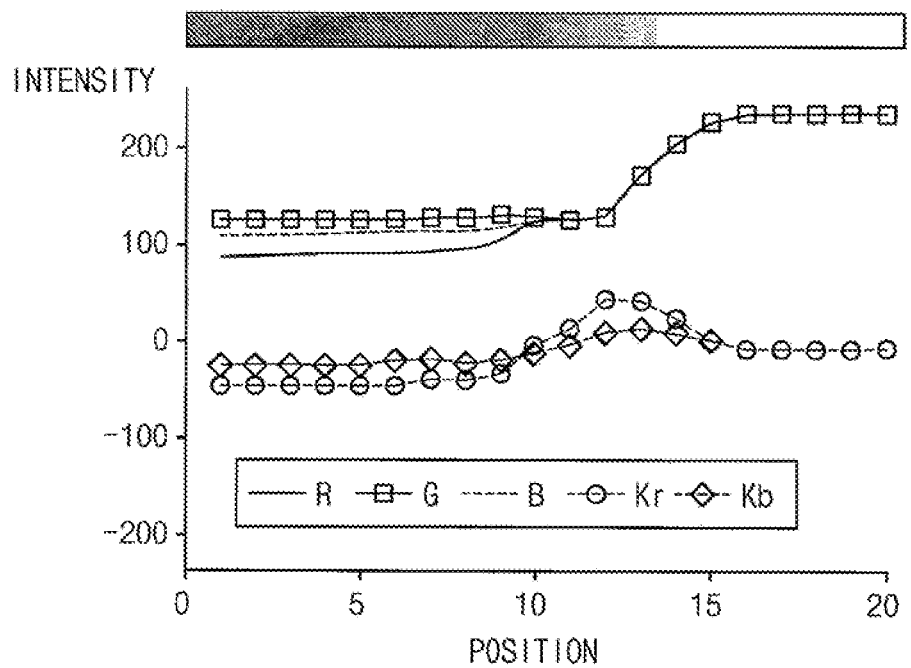
FIGS. 9B, 9C and 9D illustrate intensity profiles when an input image of FIG. 8 is corrected by converting a color fringe to grayscale.
Figure 9C:
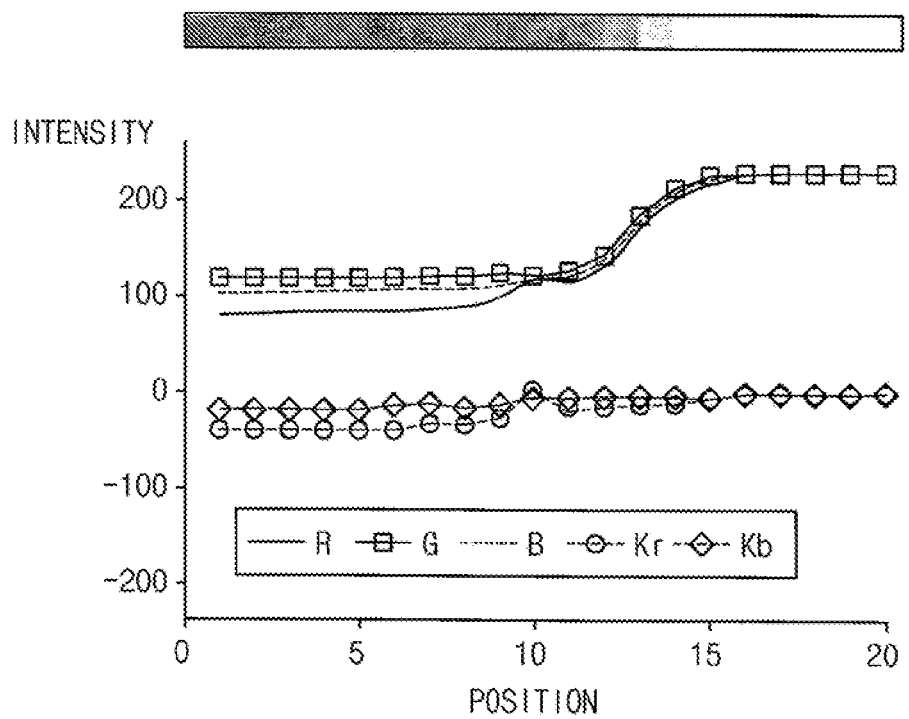
Figure 9D:
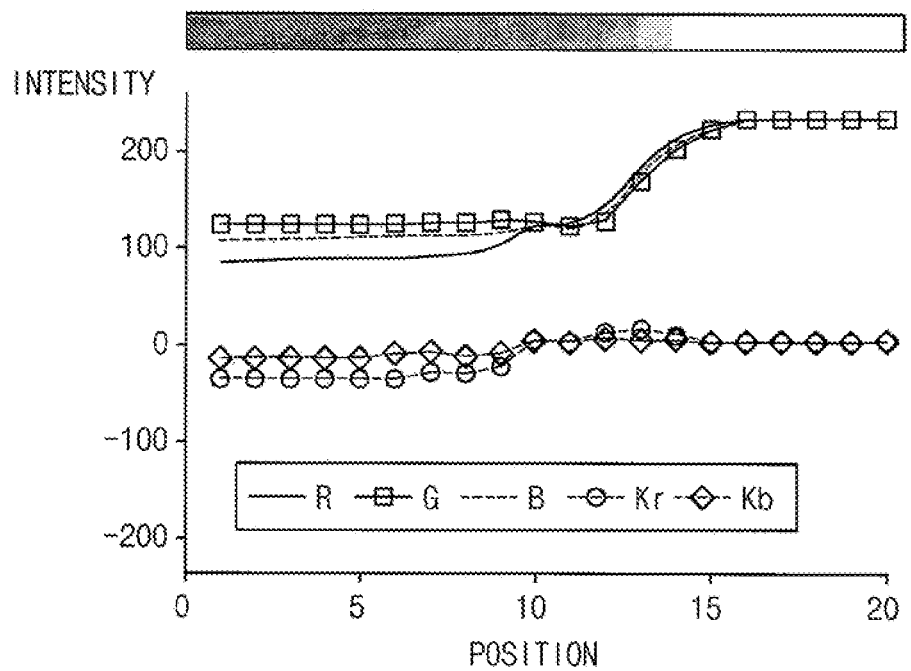
Figure 9E:
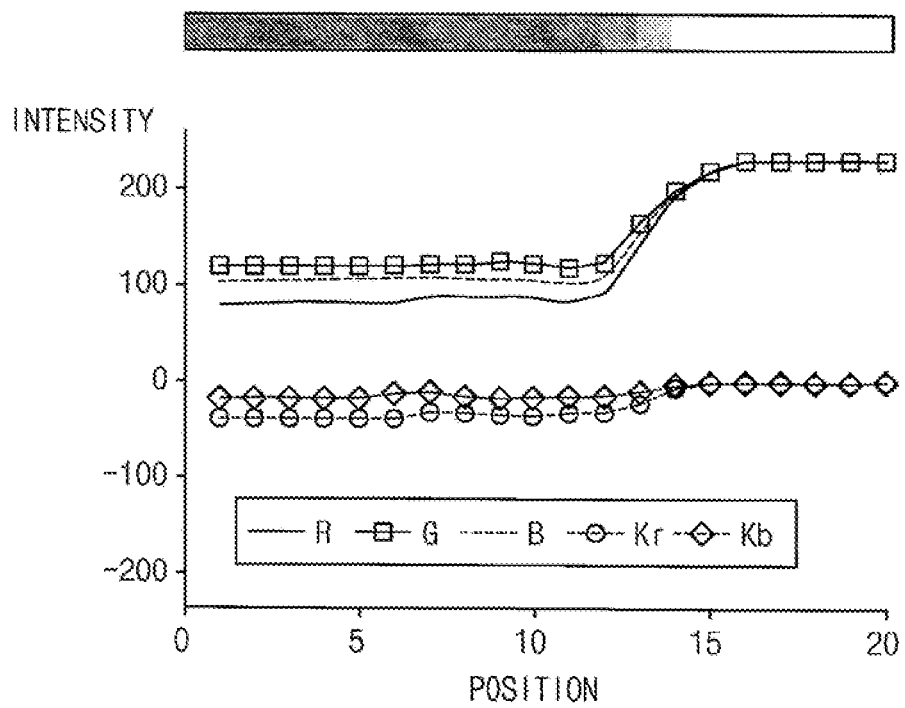
FIG. 9E illustrates an intensity profile when an input image of FIG. 8 is corrected according to exemplary embodiments.

FIG. 8 illustrates an example of an input image that includes a color fringe region, FIG. 9A illustrates an intensity profile of the input image of FIG. 8, FIGS. 9B, 9C and 9D illustrate intensity profiles when an input image of FIG. 8 is corrected by converting a color fringe to grayscale, and FIG. 9E illustrates an intensity profile when an input image of FIG. 8 is corrected according to exemplary embodiments.

The color fringe region is indicated by the rectangle and enlarged image of the color fringe region is illustrated in FIG. 8. In FIGS. 9A through 9E, the horizontal axis represents the pixel position and the vertical axis represents the intensity of the pixel data. FIGS. 9A through 9E illustrate red values R, green values G, blue values B, the color difference Kr=R−G between red and green, and the color difference Kb=B−G between blue and green, each with respect to one row in the color fringe region in FIG. 8.

Referring to FIGS. 9A through 9E, the object region at a pixel position less than about 10 has low and uniform intensity, that is, color, values, but the background region at pixel positions greater than about 15 have a high and uniform intensity. The intensity increases between the object region and the background region. In comparison with the correction results of FIGS. 9B, 9C and 9D, the correction result of FIG. 9E according to an exemplary embodiment shows that the correction is not limited to a particular color and the color distortion is corrected without corrupting the original colors of the image.

Figure 10:
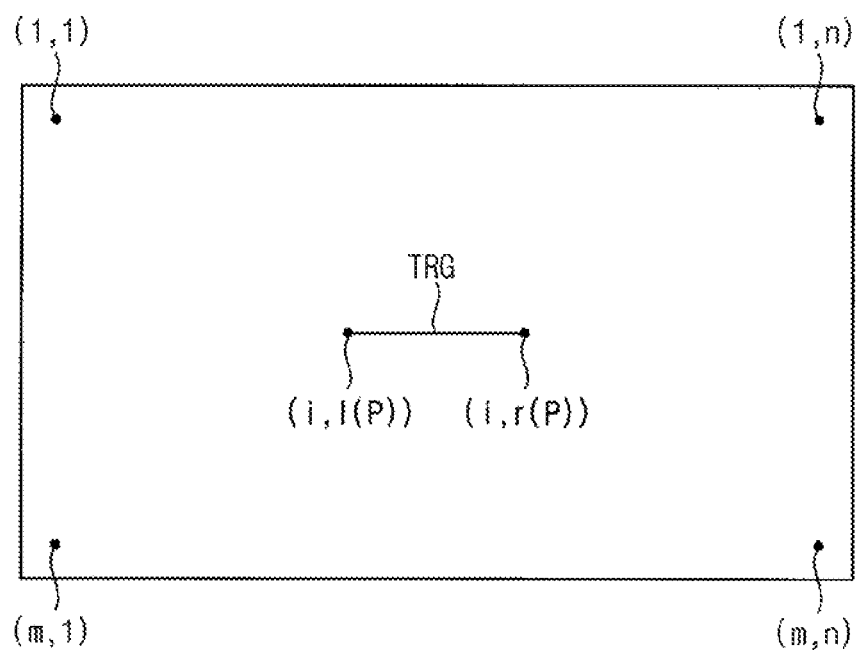
FIG. 10 illustrates an example of coordinates and an example of a transition region.

FIG. 10 illustrates an example of coordinates and an example of a transition region.

Referring to FIG. 10, a image frame according to an embodiment includes pixels arranged in a matrix form of m rows and n columns. The position of each pixel can be represented by (i, j) where i is the pixel row number and j is the pixel column number.

FIG. 10 illustrates an example of the transition region TRG for horizontal data processing. In this case, the transition region TRG is represented by the coordinates (i, l(p)) and (i, r(p)) of the boundary pixels as described above.

Figure 11:
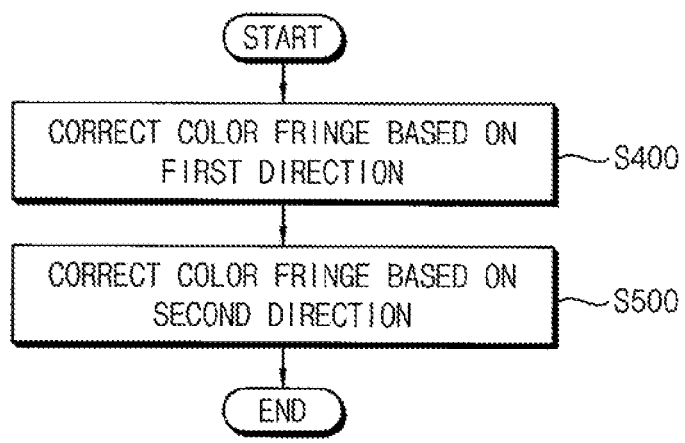
FIG. 11 is a flow chart of a method of processing image data according to exemplary embodiments.

FIG. 11 is a flow chart of a method of processing image data according to exemplary embodiments.

Referring to FIG. 11, a color fringe may be corrected based on a first direction (S400) and on a second direction perpendicular to the first direction (S500). The first direction-based correction detects first transition regions that include pixels adjacent in a first direction, and corrects the color fringe for each of the first transition regions. Similarly, the second direction-based correction detects second transition regions that include pixels adjacent in a second direction perpendicular to the first direction, and corrects the color fringe for each of the second transition regions.

In some exemplary embodiments, the first direction is a horizontal direction and the second direction is a vertical direction. In other exemplary embodiments, the first direction is a diagonal direction and the second direction is an anti-diagonal direction.

In some exemplary embodiments, color fringe correction based on the first direction is performed before performing color fringe correction based on the second direction. In other exemplary embodiments, color fringe correction based on the second direction is performed before performing color fringe correction based on the first direction.

According to exemplary embodiments, as described above, a color difference distribution in each of the first transition regions and the second transition regions cm be modeled by or fit to a logistic function. Using the logistic function, pixel color values in each of the first transition regions and the second transition regions can be corrected. Pixel color values in each of the first transition regions and the second transition regions can be corrected to maximize a correlation between a correction color and a reference color with respect to each of the first transition regions and the second transition regions.

Figure 12:
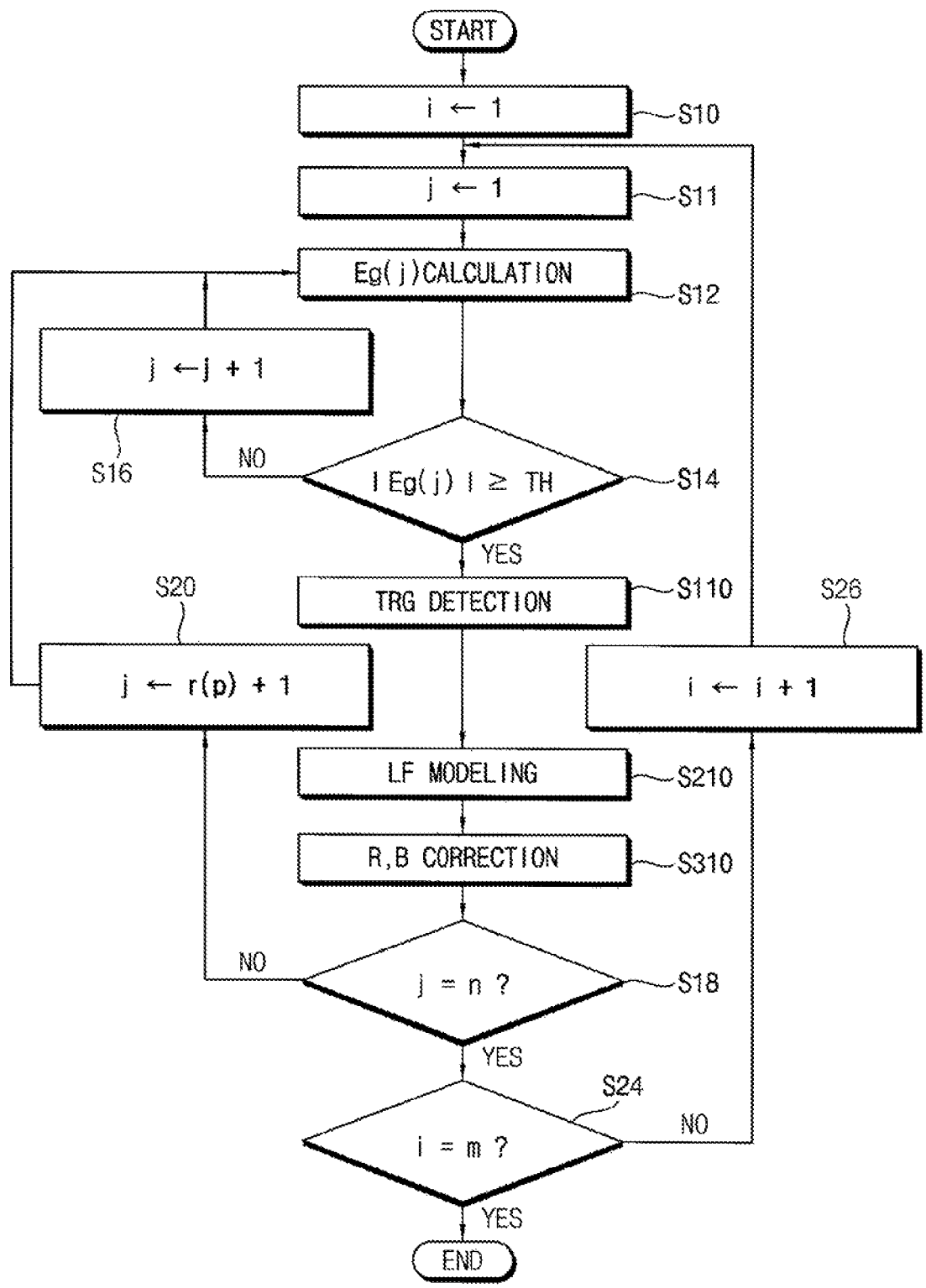
FIG. 12 is a flow chart of a method of processing image data based on one direction according to exemplary embodiments.

FIG. 12 is a flow chart of a method of processing image data based on one direction according to exemplary embodiments.

The position of the pixel can be represented as (i, j), where i is the pixel row number and j is the pixel column number as described with reference to FIG. 10. Horizontal or row-based processing of the image data is described with reference to FIG. 12. Vertical or column-based processing of the image data can be understood by exchanging i and j in FIG. 12.

Referring to FIGS. 4 and 12, the transition region detector 610 initializes the present position (i, j) of the pixel (steps S10, S11). For example, the present position (i, j) can be initialized to (1, 1), that is, the position at left-top corner in the image frame of FIG. 10. The transition detector 610 calculates the gradient value of the reference color, for example, the gradient value Eg(j) of green G at the present position (i, j) (step S12). When the gradient value Eg(j) is less than a threshold value TH (step S14: NO), the transition region detector 610 increases the column number j of the present position (i, j) by one (step S16) and calculates the gradient value Eg(j) again (step S12).

When the gradient value Eg(j) is greater than or equal to the threshold value TH (step S14: YES), the transition region detector 610 detects the transition region (step S110) as described above, and outputs the transition region information ITRG. The function value calculator 620, the color value calculator 630, the correlation value calculator 640 and the comparator 650 model the color difference with the logistic function (step S210) and correct the color values of the correction colors R and B (step S310).

If the present position (i, j) does not correspond to the last column n (step S18: NO), the transition region detector 610 sets the column number j of the present position (i, j) to the column number r(p)+1 next to the boundary pixel of the processed transition region TRG (S20) and the color fringe corrector 600 performs the above-mentioned operations.

If the present position (i, j) corresponds to the last column n (step S18: YES), the transition region detector 610 determines if the present position (i, j) corresponds to the last row m (step S24). If the present position (i, j) does not correspond to the last row m (step S24: NO), the transition region detector 610 increases the row number i by one (step S26), initializes the column number j of the present position (i, j) (step S11) and performs the above-mentioned operations. If the present position (i, j) corresponds to the last row m (step S23: YES), the color fringe corrector 600 finishes the horizontal direction image data processing.

Figure 13:
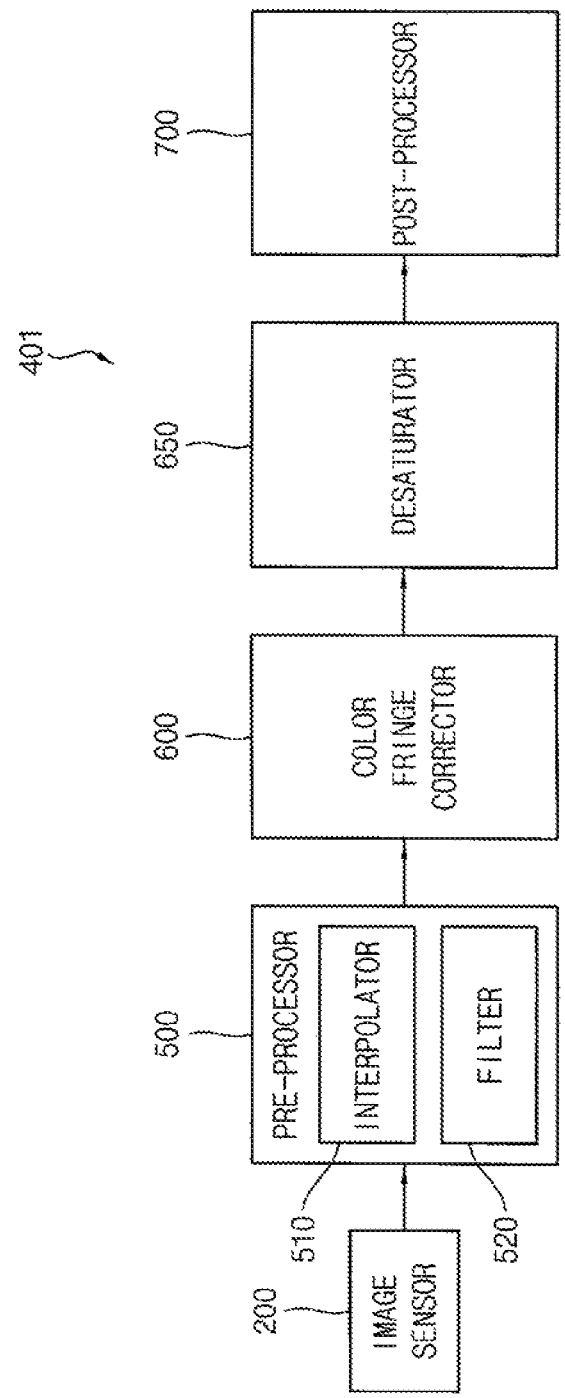
FIG. 13 illustrates an image signal processor according to exemplary embodiments.

FIG. 13 illustrates an image signal processor according to exemplary embodiments.

Referring to FIG. 13, an image signal processor 401 includes a pre-processor 500, a color fringe corrector 600, a desaturator 650 and a post-processor 700. The pre-processor 500 includes an interpolator 510 and a filter 520. In comparison with the image signal processor 400 of FIG. 3, the image signal processor 401 of FIG. 13 further includes the desaturator 650.

The interpolator 510 performs an interpolating operation that converts RGB Bayer image data received from the image sensor 200 into RGB full color image data. The RGB Bayer image data are represented by a data format in which each pixel has one of the R, G and B color values, and the RGB full color image data are represented by a data format in which each pixel has all of the R, G and B color values. The interpolator 510 may perform pixel doubling interpolation, bilinear interpolation, etc., based on the RGB Bayer image data to output the RGB full color image data.

According to an embodiment, the filter 520 may performs a filtering operation that removes noise in the image data. For example, the filter 520 may be a bilateral filter that smoothes an image while conserving edges in the image. A bilateral filter is a nonlinear filter whose output is represented by an adaptive average. When the input image includes noise, a low pass Gaussian filter is used to remove noise. An intensity-based edge-stop function whose input is an intensity difference between pixels is used to calculate weight values of the Gaussian filter coefficients. With respect to edge portions, where an intensity difference is large, the weight value can be decreased to prevent edge blurring. When the intensity difference is small, the weigh value can be increased to remove noise. Through such bilateral filtering, isolation regions or holes in saturation regions can be removed as will be described with reference to FIG. 13. The color values of saturated pixels can be detected as being less than the actual values because of noise in the image sensor, interpolation of the color filter array, etc. A bilateral filter can correct such unreliable detection in a saturation region.

In some exemplary embodiments, the interpolation of the interpolator 510 is performed before noise filtering of the filter 520 is performed on the interpolated image data. In other exemplary embodiments, noise filtering is performed before interpolating the noise-filtered image data. In still other exemplary embodiments, interpolation and noise filtering can be performed simultaneously.

The color fringe corrector 600 receives the RGB full color image data from the pre-processor 500 and corrects of color fringes and processes the image data using the color fringe correction. The desaturator 650 receives the corrected data from the color fringe corrector 600 and corrects color values of saturated pixels adjacent to the transition region TRG. The corrected image data are output to the post-processor 700 for further processing.

In general, according to embodiments, the transition region and the saturation region are adjacent to each other. The desaturator 650 corrects the saturation region using information already obtained by the color fringe corrector together with the information of the transition region.

Figures 14, 15:
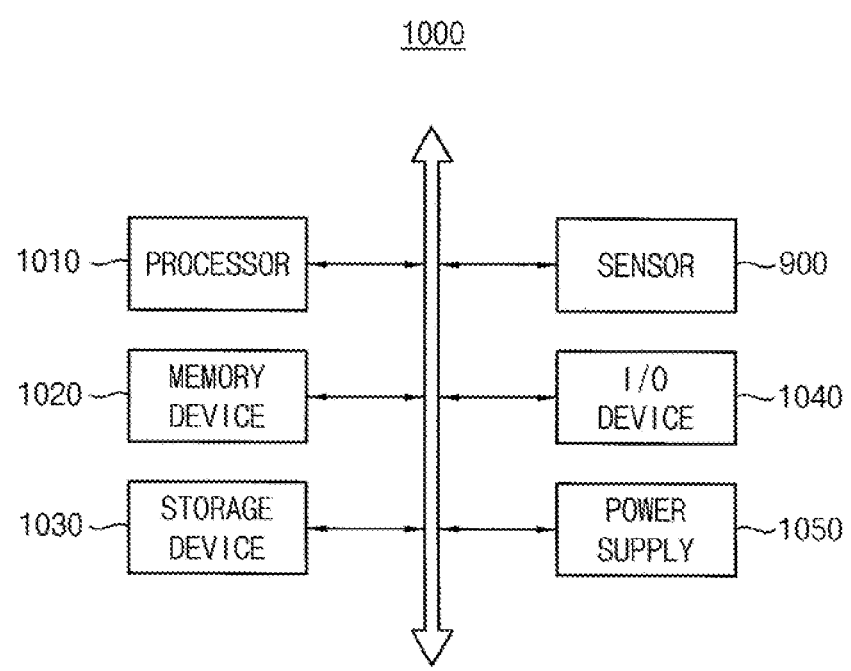
FIG. 14 illustrates a maximum signal-to-noise ratio in processing image data.
FIG. 15 is a block diagram of a computer system according to exemplary embodiments.

FIG. 14 illustrates a maximum signal-to-noise ratio in processing image data.

FIG. 14 illustrates results of quantitative estimation using various sample images PIC1, PIC2 and PIC3. The first image PIC1 is the same as that of FIG. 8. For the quantitative estimation, a peak signal-to-noise ratio (PSNR) as expressed by Equation 8 can be used.

$$PSNR = 10 \log_{10}\left(\frac{255^2}{MSE}\right). \qquad \text{Equation 8}$$

In Equation 8, MSE is the mean square error, which is a dispersion of intensity of a selected region. The first case CASE1 corresponds to an original image, the second, third and fourth cases CASE2, CASE3 and CASE4 correspond to images corrected by converting a color fringe to grayscale, and the fifth case CASE5 corresponds to an image corrected according to exemplary embodiments. According to exemplary embodiments, color distortion such as a color fringe can be corrected without corrupting the original colors of the image. Accordingly, the fifth case CASE5 according to exemplary embodiments has the highest PSNR value compared with the cases CASE2, CASE3 and CASE4, corrected by grayscale conversion.

FIG. 15 is a block diagram of a computer system according to exemplary embodiments.

Referring to FIG. 15, a computing system 1000 includes a processor 1010, a memory device 1020, a storage device 1030, an input/output device 1040, a power supply 1050, and an image sensor 900.

According to embodiments, the processor 1010 performs various calculations and tasks. According to some embodiments, the processor 1010 is a microprocessor or a central processing unit (CPU). The memory device 1020 stores data for operating the computing system 1000. For example, the memory device 1020 may be a dynamic random access memory (DRAM) device, a mobile DRAM device, a static random access memory (SRAM) device, a phase random access memory (PRAM) device, a ferroelectric random access memory (FRAM) device, a resistive random access memory (RRAM) device, or a magnetic random access memory (MRAM) device. The storage device 1030 may include a solid state drive (SSD), a hard disk drive (HDD), a compact-disc read-only memory (CD-ROM), etc. The input/output device 1040 may include an input device, such as a keyboard, a keypad, a mouse, etc., and an output device, such as a printer, a display device etc. The power supply 1050 supplies operation voltages for the computing system 1000.

According to an embodiment, the image sensor 900 communicates with the processor 1010 via a bus or other communications link. The image sensor 900 may be integrated with the processor 1010 in one chip, or the image sensor 900 and the processor 1010 may be implemented as separate chips. A color fringe corrector according to exemplary embodiments may be included with the processor 1010 or with the image sensor 900.

The computing system 1000 may be any computing system configured to correct saturated pixel data according to exemplary embodiments. For example, the computing system 1000 may be a digital camera, a mobile phone, a smart phone, a portable multimedia player (PMP), a personal digital assistant (PDA), a wearable computing device, or any other computing device.

As described above, a method of correcting color fringes and a method of processing image data according to exemplary embodiments may correct color distortion such as color fringes without corrupting the original colors of the image by modeling the color difference CD with the logistic function LF while maximizing the correlation by using information of the undistorted region. In addition, a method of correcting color fringes and a method of processing image data according to exemplary embodiments can reduce a calculation cost by reducing the number of the parameters for optimizing the logistic function LF.

Embodiments of the present inventive concept may be incorporated into any device or system that includes an image sensor. For example, an embodiment of the present inventive concept may be incorporated into systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from embodiments of the present inventive concept.

What is claimed is:

1. A method of correcting a color fringe in a digital image, comprising:
   detecting a transition region in the digital image that includes pixels adjacent in a linear direction, wherein pixels in the transition region exhibit color distortions;
   modeling a color difference distribution in the transition region with a logistic function; and
   correcting color values of the pixels in the transition region using the logistic function, wherein the color distortions in the transition region are eliminated,
   wherein the pixel color values in the transition region are corrected to maximize a correlation between a correction color and a reference color with respect to the transition region.

2. The method of claim 1, wherein a corrected correction color value corresponds to a sum of a value of the reference color and a value of the logistic function when the correlation is maximized.

3. The method of claim 1, wherein the reference color is green and the correction color is either red or blue.

4. The method of claim 3, wherein, with respect to the transition region, red pixel values are corrected to maximize the correlation between red and green, and blue pixel values are corrected to maximize the correlation between blue and green.

5. The method of claim 1, wherein the logistic function is defined by $$LF(x) = K'c_2(x) = \frac{A}{1+e^{-\gamma(x-\tau)}} + B,$$

wherein LF( ) is a function value of the logistic function, x is a pixel coordinate, A is a first parameter, B is a second parameter, $\gamma$ is a third parameter and $\tau$ is a fourth parameter, $c_2$ is the correction color, and $K'c_2$( ) is a calculated color difference between the correction color and the reference color.

6. The method of claim 5, wherein the first parameter (A) and the second parameter (B) are determined as following equations, $A = Kc_2\text{max} - Kc_2\text{min}$ $B = Kc_2\text{min}$ $Kc_2\text{min} = \min\{Kc_2[l(p)], Kc_2[r(p)]\}$ $Kc_2\text{max} = \max\{Kc_2[l(p)], Kc_2[r(p)]\}$ $Kc_2[x] = C_2(x) - C_1(x)$ where l(p) and r(p) are coordinates of boundary pixels of the transition region, $Kc_2[\ ]$ is the color difference between the correction color and the reference color, $C_2$( ) is the color value of the correction color and $C_1$( ) is the color value of the reference color.

7. The method of claim 5, wherein the third parameter and the fourth parameter are determined by maximizing the correlation between the correction color and the reference color with respect to the transition region.

8. The method of claim 5, wherein the third value is fixed to a constant value and the fourth parameter is determined by maximizing the correlation between the correction color and the reference color with respect to the transition region.

9. The method of claim 5, wherein the correlation between the correction color and the reference color is determined by $$\rho(C'_2(k), C_1) = \frac{\sum_{k=l(p)}^{r(p)} (C'_2(k) - mc_2)(C_1(k) - mc_1)}{\sqrt{\sum_{k=l(p)}^{r(p)} (C'_2(k) - mc_2)^2} \sqrt{\sum_{k=l(p)}^{r(p)} (C_1(k) - mc_1)^2}},$$

$$C'_2(x) = K'c_2(x) + C_1(x)$$

where $\rho(\ )$ is a value of the correlation, $l(p)$ and $r(p)$ are coordinates of boundary pixels of the transition region, $C'_2(\ )$ is a calculated color value of the correction color obtained using the logistic function, $C_1(\ )$ is the color value of the reference color, $mc_1$ is an average value of $C_1$ and $mc_2$ is an average value of $C'_2$.

10. The method of claim 1, wherein correcting pixel color values includes:
   calculating correlation values by changing parameters of the logistic function;
   determining an optimal logistic function that corresponds to a maximum correlation value; and
   outputting corrected color pixel values based on the optimal logistic function.

11. The method of claim 1, wherein detecting the transition region includes:
   detecting a reference pixel wherein the reference color of the reference pixel has a gradient value greater than or equal to a threshold value;
   expanding the transition region to include an pixels adjacent in a linear direction with respect the reference pixel if at least one color of the adjacent pixel has a gradient value greater than or equal to the threshold value; and
   determining boundary pixels of the transition region, wherein color gradient values of the boundary pixels are less than the threshold value.

12. The method of claim 1, further comprising:
   correcting color values of saturated pixels adjacent to the transition region.

13. A method of processing image data, comprising:
   detecting first transition regions in a digital image, each first transition region including pixels adjacent in a first direction, wherein pixels in the first transition regions exhibit color distortions;
   detecting second transition regions in the digital image, each second transition region including pixels adjacent in a second direction perpendicular to the first direction, wherein pixels in the second transition regions exhibit color distortions;
   modeling a color difference distribution in each of the first transition regions and the second transition regions with a logistic function; and
   correcting color values of the pixels in each of the first transition regions and the second transition regions using the logistic function, wherein the color distortions in the first transition region and the second transition region are eliminated.

14. The method of claim 13, wherein pixel color values in each of the first transition regions and the second transition regions are corrected to maximize a correlation between a correction color and a reference color with respect to each of the first transition regions and the second transition regions.

15. A system for correcting color fringes in digital images, comprising:
   a transition region detector that detects from input image data a transition region that includes pixels adjacent in a linear direction, wherein pixels in the transition region exhibit color distortions;
   a function value calculator that models transition region information with a logistic function;
   a color value calculator that calculates first corrected image data based on the input image data and logistic function values output by the function value calculator;
   a correlation value calculator that calculates a correlation based on the first corrected image data; and
   a comparator that compares the values of the correlation received from the correlation value calculator and outputs second corrected image data that corresponds to a maximum of the correlation, wherein the color distortions in the transition region are eliminated.

16. The system of claim 15, wherein transition region detector detects a reference pixel wherein a reference color of the reference pixel has a gradient value greater than or equal to a threshold value, expands the transition region to include an pixels adjacent in a linear direction with respect the reference pixel if at least one color of the adjacent pixel has a gradient value greater than or equal to the threshold value, and determines boundary pixels of the transition region, wherein color gradient values of the boundary pixels are less than the threshold value.

17. The system of claim 16, wherein the logistic function is defined by $$LF(x) = K'c_2(x) = \frac{A}{1 + e^{-\gamma(x-\tau)}} + B,$$

wherein $LF(\ )$ is a function value of the logistic function, $x$ is a pixel coordinate, $A$ is a first parameter, $B$ is a second parameter, $\gamma$ is a third parameter and $\tau$ is a fourth parameter, $C_2$ is a correction color, $K'c_2(\ )$ is a calculated color difference between the correction color and the reference color,
wherein the first parameter (A) and the second parameter (B) are determined from $A = Kc_2\text{max} - Kc_2\text{min}$ $B = Kc_2\text{min}$ $Kc_2\text{min} = \min \{Kc_2[l(p)], Kc_2[r(p)]\}$ $Kc_2\text{max} = \max \{Kc_2[l(p)], Kc_2[r(p)]\}$ $Kc_2[x] = C_2(x) - C_1(x)$ wherein $l(p)$ and $r(p)$ are coordinates of boundary pixels of the transition region, $Kc_2[\ ]$ is the color difference between the correction color and the reference color, $C_2(\ )$ is the color value of the correction color and $C_1(\ )$ is the color value of the reference color.

18. The system of daily 16, wherein the color value calculator calculates first corrected image data $C'_2(x)$ and $C'_1(x)$ from $C'_2(x) = K'c_2(x) + C_1(x)$ and $C'_1(x) = C_1(x)$, wherein $x$ is a pixel coordinate, $K'c_2(\ )$ is a calculated color difference between the correction color and the reference color and $C_1(\ )$ is the color value of the reference color.

19. The system of claim 18, wherein the correlation $\rho(\ )$ between the correction color and the reference color is determined by $$\rho(C'_2(k), C_1) = \frac{\sum_{k=l(p)}^{r(p)} (C'_2(k) - mc\ 2)(C_1(k) - mc\ 1)}{\sqrt{\sum_{k=l(p)}^{r(p)} (C'_2(k) - mc\ 2)^2} \sqrt{\sum_{k=l(p)}^{r(p)} (C_1(k) - mc\ 1)^2}},$$

wherein l(p) and r(p) are coordinates of the boundary pixels of the transition region, and the second corrected image data is calculated from $$C''_2(x) = \arg\max_{c_2}\{|\rho(C'_2, C_1)|\}.$$

\* \* \* \* \*